(12) United States Patent
Takano et al.

(10) Patent No.: US 9,748,532 B2
(45) Date of Patent: Aug. 29, 2017

(54) BELT WITH BUILT-IN BATTERIES

(71) Applicant: Samsung SDI Co., Ltd., Yongin-si, Gyeonggi-do (KR)

(72) Inventors: Yasuo Takano, Yokohama (JP); Hironobu Fukahori, Yokohama (JP); Takahiro Endo, Yokohama (JP)

(73) Assignee: Samsung SDI Co., Ltd., Yongin-si (KR)

( * ) Notice: Subject to any disclaimer, the term of this patent is extended or adjusted under 35 U.S.C. 154(b) by 22 days.

(21) Appl. No.: 14/566,607

(22) Filed: Dec. 10, 2014

(65) Prior Publication Data
US 2015/0162577 A1 Jun. 11, 2015

(30) Foreign Application Priority Data

Dec. 11, 2013 (JP) .................................. 2013-256396
Dec. 3, 2014 (KR) ........................ 10-2014-0172258

(51) Int. Cl.
| | |
|---|---|
| *H01M 2/02* | (2006.01) |
| *H01M 2/10* | (2006.01) |
| *H01M 2/20* | (2006.01) |
| *H01M 2/36* | (2006.01) |

(52) U.S. Cl.
CPC ......... *H01M 2/1005* (2013.01); *H01M 2/204* (2013.01); *H01M 2/0202* (2013.01); *H01M 2/365* (2013.01); *H01M 2220/30* (2013.01)

(58) Field of Classification Search
CPC .. H01M 2220/30; H01M 2/02; H01M 2/1022; H01M 2/22; H01M 2/1005
See application file for complete search history.

(56) References Cited

U.S. PATENT DOCUMENTS

| | | | | |
|---|---|---|---|---|
| 2,681,955 | A | * | 6/1954 | Davis ...................... F21V 23/04 200/52 R |
| 3,828,201 | A | * | 8/1974 | Allen, Sr. ................. F21L 4/06 307/150 |
| 3,919,615 | A | * | 11/1975 | Niecke .................. H01M 10/46 224/663 |
| 5,680,026 | A | * | 10/1997 | Lueschen .................. A45F 5/00 224/674 |

(Continued)

FOREIGN PATENT DOCUMENTS

| | | |
|---|---|---|
| JP | 11-508997 | 8/1999 |
| JP | 2003-306819 | 10/2003 |

(Continued)

OTHER PUBLICATIONS

Patent Abstracts of Japan and English Machine Translation of Japanese Publication No. 2003-306819, 9 Pages.

*Primary Examiner* — Olatunji Godo
(74) *Attorney, Agent, or Firm* — Lewis Roca Rothgerber Christie LLP

(57) ABSTRACT

A belt with built-in batteries includes: a plurality of rechargeable batteries, each having a positive terminal and a negative terminal that protrude in two opposite directions; a positive reinforcing tab that electrically connects the positive terminals of the rechargeable batteries to each other; a negative reinforcing tab that electrically connects the negative terminals of the rechargeable batteries to each other; and a sheath that seals the positive and negative terminals of the rechargeable batteries and the positive and negative reinforcing tabs.

20 Claims, 13 Drawing Sheets

(56) References Cited

U.S. PATENT DOCUMENTS

| 2007/0082265 | A1* | 4/2007 | Itou | H01M 4/131 |
| | | | | 429/223 |
| 2009/0169990 | A1* | 7/2009 | Gardner | H01M 2/30 |
| | | | | 429/179 |
| 2009/0176153 | A1* | 7/2009 | Yoon | H01M 2/30 |
| | | | | 429/162 |

FOREIGN PATENT DOCUMENTS

| KR | 20-0212929 | 2/2001 |
| WO | WO 97/02513 | 1/1997 |

* cited by examiner

BELT WITH BUILT-IN BATTERIES

CROSS-REFERENCE TO RELATED APPLICATIONS

This application claims priority to and the benefit of Japanese Patent Application No. 2013-256396 filed in the Japanese Intellectual Property Office on Dec. 11, 2013 and Korean Patent Application No. 10-2014-0172258 filed in the Korean Intellectual Property Office on Dec. 3, 2014, the entire contents of both of which are incorporated herein by reference.

BACKGROUND

1. Field

The present invention relates to a belt with built-in batteries.

2. Description of the Related Art

In recent years, electronic devices have been rapidly getting smaller and smaller.

With the trend toward miniaturization of electronic devices, there are wearable electronic devices being developed which are miniaturized to be worn on the body, such as a wristwatch, glasses, etc.

When using a battery as a power source for such an electronic device, it is difficult to secure sufficient battery capacity by having multiple batteries embedded in an electronic device due to the limited space in the electronic device.

For example, a technique of securing battery capacity by embedding batteries in a belt has been suggested.

However, with such suggested technique, there is the possibility of a short circuit occurring when a liquid, such as sweat, comes into contact with electrode terminals because the electrode terminals are exposed and connected between the batteries.

The above information disclosed in this Background section is only for enhancement of understanding of the background of the invention and therefore it may contain information that does not form the prior art that is already known to a person of ordinary skill in the art.

SUMMARY

The present invention has been made in an effort to provide a new and improved belt with built-in batteries, which is capable of preventing or substantially preventing a short circuit at electrode terminals.

The belt includes: a plurality of rechargeable batteries, each having a positive terminal and a negative terminal that protrude in two opposite directions; a positive reinforcing tab that electrically connects the positive terminals of the rechargeable batteries to each other; a negative reinforcing tab that electrically connects the negative terminals of the rechargeable batteries to each other; and a sheath that seals the positive and negative terminals of the rechargeable batteries and the positive and negative reinforcing tabs.

The positive reinforcing tab may be welded to a side of each positive terminal facing a first direction, and the negative reinforcing tab may be welded to a side of each negative terminal facing a second direction opposite to the first direction.

The positive reinforcing tab and the negative reinforcing tab may extend along the length of the sheath, and the positive reinforcing tab may be welded to a plurality of positive terminals and located on a first side of each rechargeable battery, and the negative reinforcing tab may be welded to a plurality of negative terminals and located on a second side of each rechargeable battery opposite to the first side.

The positive reinforcing tab may include a plurality of positive reinforcing tabs and may be welded to either side of each positive terminal, and the negative reinforcing tab may include a plurality of negative reinforcing tabs and may be welded to either side of each negative terminal.

The positive reinforcing tab and the negative reinforcing tab may extend along the length of the sheathing portion, and the positive reinforcing tab may be welded to either side of each positive terminal, and the negative reinforcing tab may be welded to either side of each negative terminal.

The rechargeable batteries each may include an electrode assembly formed by winding positive electrode, a negative electrode, and a separator, and the positive terminal and the negative terminal may protrude in the same direction as a winding axis of the electrode assembly.

The positive terminal and the negative terminal may protrude in a direction orthogonal to the winding axis of the electrode assembly, and the rechargeable batteries may be polymer batteries with a gel electrolyte.

The rechargeable batteries may be electrically connected in parallel by the positive reinforcing tab and the negative reinforcing tab, and the rechargeable batteries may be arranged in at least one line along the length of the sheath.

The positive and negative terminals of one of the rechargeable batteries may be placed to face the positive and negative terminals of another rechargeable battery adjacent in the length direction of the sheath.

The positive terminals and the negative terminals may be joined by a hinge structure, the positive reinforcing tab and the negative reinforcing tab may be installed in such a way as to cover the hinge structure, and the sheath may integrally seal the positive terminals, the negative terminals, the positive reinforcing tab, and the negative reinforcing tab.

The sheath may include a laminate film, and the positive reinforcing tab and the negative reinforcing tab may be bent.

The sheath may further include a connecting portion that is connected to an electronic device located on one end of the length of the sheath and allows conduction between the rechargeable batteries and the electronic device.

The belt may further include buckle portions that are located at one end of the length of the sheath and the other end, respectively, to adjust the length of the sheath, and the positive reinforcing tab and the negative reinforcing tab may be made of a copper-containing metal.

According to one aspect of the present invention, a belt with built-in batteries can prevent or substantially prevent a short circuit at electrode terminals by covering and sealing positive terminals, negative terminals, and joining portions with a sheathing portion (or a sheath) having water resistance and insulation properties.

According to another aspect of the present invention, the belt with built-in batteries can improve battery capacity by accommodating more rechargeable batteries.

According to yet another aspect of the present invention, the belt with built-in batteries can enhance the available usage time of an electronic device connected to the belt.

DETAILED DESCRIPTION

Figure 1:
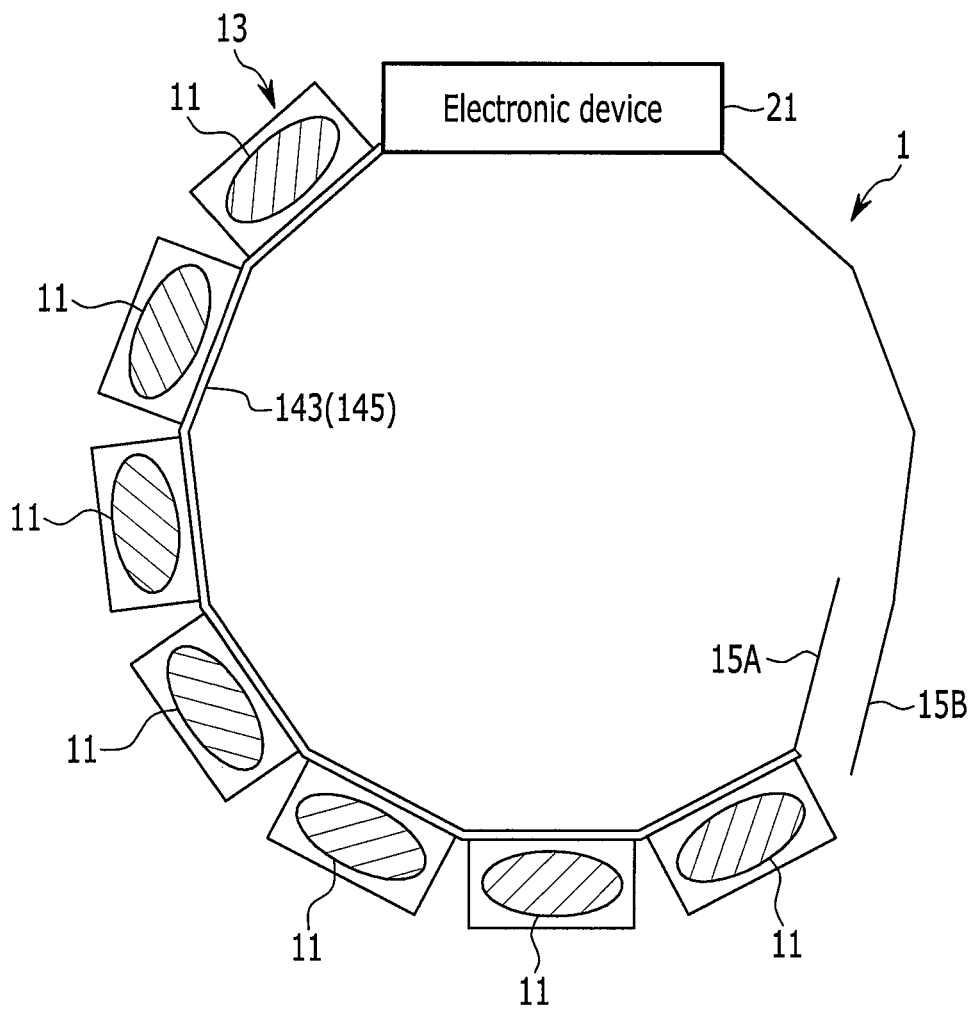
FIG. 1 is a top plan view schematically showing a belt with built-in batteries according to an exemplary embodiment of the present invention.

Hereinafter, embodiments of the present invention will be described in detail with reference to the accompanying drawings so that one of ordinary skill in the art may realize the embodiments of the present invention without undue experimentation. However, the present invention may be embodied in many different forms and should not be construed as being limited to the embodiments set forth herein. Like reference numerals denote like elements throughout the specification and the drawings. Also, when a first element is referred to as being "connected to" or "coupled to" a second element, the first element may be "directly connected to" or "directly coupled to" the second element, or "indirectly connected to" or "indirectly coupled to" the second element with one or more other elements interposed therebetween.

Figure 2A:
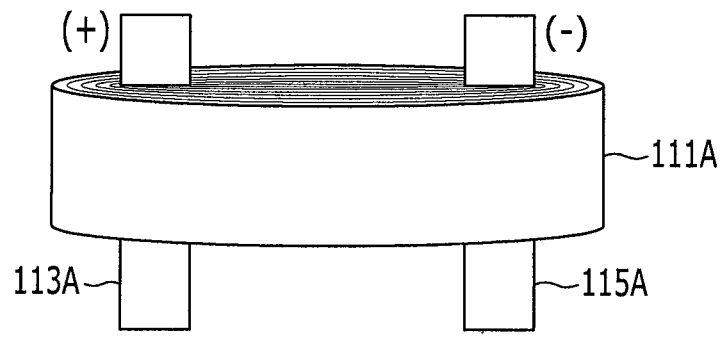
FIG. 2A is a perspective view showing an electrode assembly of a rechargeable battery embedded in the belt of FIG. 1.

FIG. 1 is a top plan view schematically showing a belt with built-in batteries according to an exemplary embodiment of the present invention. FIG. 2A is a perspective view showing an electrode assembly of a rechargeable battery embedded in the belt of FIG. 1, Referring to FIGS. 1 and 2A, the belt 1 with built-in batteries according to the present exemplary embodiment includes joining portions 143 and 145 that electrically connect positive and negative terminals 113A and 115A of a plurality of rechargeable batteries 11, and a sheathing portion (or a sheath) 13 that seals the positive and negative terminals 113A and 115A of the rechargeable batteries 11 and the joining portions 143 and 145 and has water resistance and insulation properties.

The belt 1 with built-in batteries according to the exemplary embodiment of the present invention may be connected to both ends of an electronic device 21.

That is, according to the present exemplary embodiment, the sheathing portion 13 may further include a connecting portion that is connected to the electronic device 21 located on one end of the length of the sheathing portion 13 and allows conduction between the rechargeable batteries 11 and the electronic device 21.

The electronic device 21 is worn on the user's body using the belt 1 with built-in batteries.

The electronic device 21 can be worn on the head, wrist, arm, ankle, waist, etc.

The present invention is not limited to these examples, and the electronic device 21 can be worn on any suitable part of the body so long as the belt 1 is worn by being wound around it.

The electronic device 21 and the belt 1 can be separated from each other.

With this configuration, when the electrical power stored in the belt 1 is all discharged and the electronic device 21 becomes unusable, the electronic device 21 can be brought back into use by replacing the belt 1 with a new one.

Alternatively, the electronic device 21 can be put into use by charging the rechargeable batteries 11 embedded in the belt 1, without replacing the belt 1 with a new one.

The rechargeable batteries 11 are embedded in the belt 1 and arranged in a line along the length of the belt 1, and are electrically connected to one another to supply electric power to the electronic device 21.

In the described embodiment, the rechargeable batteries 11 may be connected in parallel to one another in order to increase the battery capacity.

Moreover, the rechargeable batteries 11 may be arranged in at least one line within the belt 1 along the length of the sheathing portion 13.

The rechargeable batteries 11 according to the present exemplary embodiment may be lithium ion rechargeable batteries each including an electrode assembly including a positive plate, a negative plate, and a separator, and an electrolyte.

Also, the rechargeable batteries 11 may be lithium ion rechargeable batteries which are each made of an electrode assembly and an electrolyte solution that are enclosed in a container of a given shape.

Accordingly, the rechargeable batteries 11 can be sealed with the sheathing portion 13 and embedded in the belt 1 after they are electrically connected.

However, the rechargeable batteries 11 are not limited to those batteries which are each made of an electrode assembly and an electrolyte solution that are enclosed in a container of a given shape.

That is, the rechargeable batteries 11 according to the present exemplary embodiment may be lithium ion rechargeable batteries which are each made of an electrode assembly and an electrolyte solution that are sealed with the sheathing portion 13.

For example, the rechargeable batteries 11 may be produced by electrically connecting an electrode assembly to another electrode assembly, injecting an electrolyte solution just prior to (e.g., immediately before) sealing the electrode assemblies with the sheathing portion 13, and then sealing the sheathing portion 13, rather than by enclosing the electrode assemblies, along with the electrolyte solution, in a container of a given shape.

The sheathing portion 13 may play the same role as the container of the rechargeable batteries 11 in some embodiments.

The electrolyte of the rechargeable batteries 11 may be made of a gel-like polymer material.

When the container of the rechargeable batteries 11 is made up of the sheathing portion 13, the electrolyte may be exposed to the outside in the event of damage to the sheathing portion 13.

Accordingly, when the rechargeable batteries 11 are polymer batteries with a gel electrolyte having low fluidity, this can prevent or substantially prevent electrolyte leakage, thereby improving the safety of the belt 1.

The sheathing portion 13 has water resistance and insulation properties, and integrally seals the rechargeable batteries 11, the positive and negative terminals 113A and 115A of the rechargeable batteries 11, and the terminals of the joining portions 143 and 145 by covering wires for connecting them.

Alternatively, the sheathing portion 13 may integrally seal the rechargeable batteries 11 by covering them.

For example, the sheathing portion 13 may be made of at least one covering material with high water resistance and high insulating properties such as a laminate film, natural rubber (gum), and/or synthetic rubber.

By sealing the rechargeable batteries 11 with the sheathing portion 13, the wires for connecting the positive and negative terminals 113A and 115A of the rechargeable batteries 11 and the terminals of the joining portions 143 and 145 are insulated from one another, and protected from liquids coming in from the outside.

With this configuration, the belt 1 with built-in batteries according to the exemplary embodiment of the present invention can prevent or substantially prevent the electrode terminals and their wires from being short-circuited even when the belt 1 is exposed to liquids such as sweat.

The sheathing portion 13 may be made from a highly flexible material so as to be worn on the user's body by being wound on it.

Also, the sheathing portion 13 can be worn on the user's body after being bonded to a well-known material of the belt, such as leather or metal, or only the sheathing portion 13 can be worn on the user's body.

According to the present exemplary embodiment, the belt 1 may further include buckle portions 15A and 15B that are located at one end of the length of the sheathing portion 13 and the other end, respectively, to adjust the length of the sheathing portion 13.

Specifically, the buckle portions 15A and 15B are formed at one end configured to be connected to the electronic device 21 of the belt 1 and the other end, respectively, to connect the two ends of the belt, with the electronic device 21 interposed between them.

The buckle portions 15A and 15B may include a component for adjusting the length of the belt 1 by changing the connecting position of the belt 1 or a component for adjusting the length of the belt 1 by adjusting the lengths of the buckle portions 15A and 15b.

For example, the buckle portions 15A and 15B may be either a metal fastener such as a snap-fit (catch) buckle, a slide buckle, etc. for adjusting the length of the belt, or any other suitable metal fastener of the belt known to those skilled in the art.

Figure 2B:
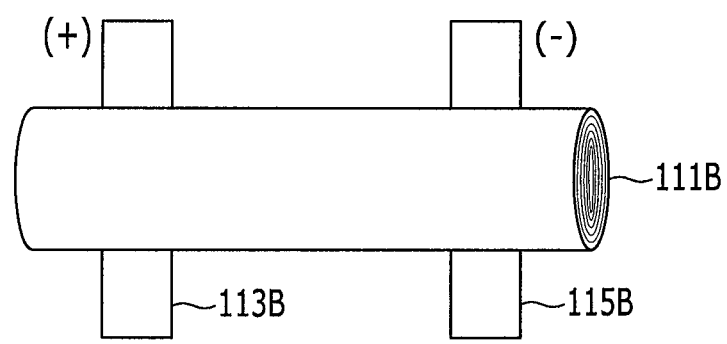
FIG. 2B is a perspective view showing a different electrode assembly from the electrode assembly of the rechargeable battery of FIG. 2A.
Figure 2C:
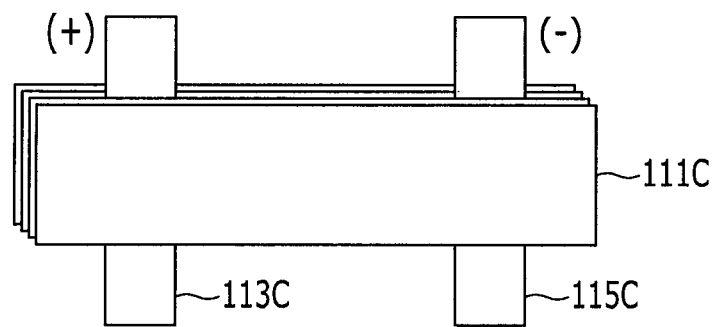
FIG. 2C is a perspective view showing a different electrode assembly from the electrode assemblies of the rechargeable batteries of FIGS. 2A and 2B.

FIG. 2B is a perspective view showing a different electrode assembly from the electrode assembly of the rechargeable battery of FIG. 2A, and FIG. 2C is a perspective view showing a different electrode assembly from the electrode assemblies of the rechargeable batteries of FIGS. 2A and 2B.

Figure 3A:
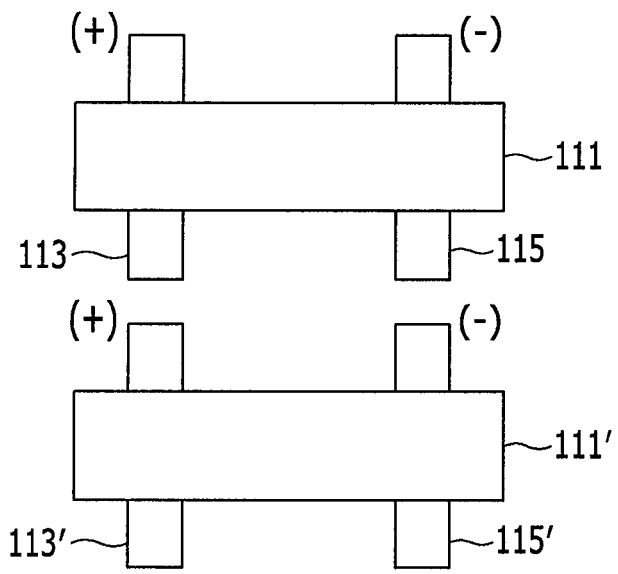
FIGS. 3A and 3B are schematic views showing that electrode assemblies of rechargeable batteries are joined together according to an exemplary embodiment of the present invention.
Figure 3B:
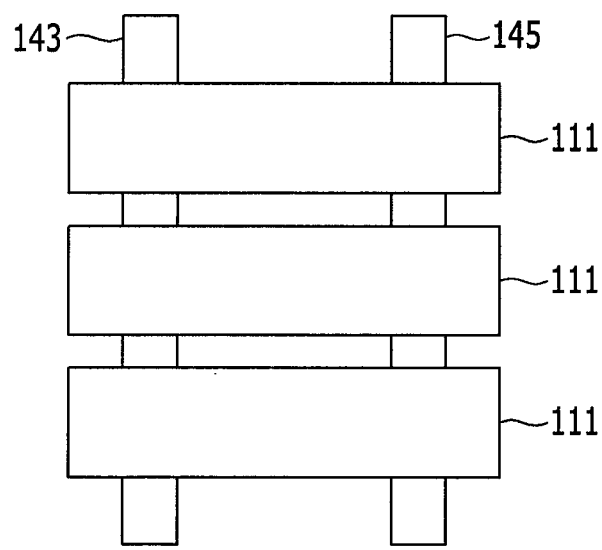
Figure 4A:
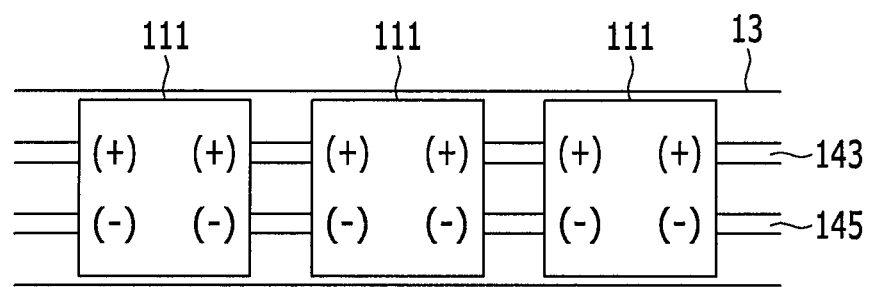
FIGS. 4A, 4B and 4C are schematic views showing that electrode assemblies are sealed with a sheathing portion (or a sheath) according to an exemplary embodiment of the present invention.
Figure 4B:
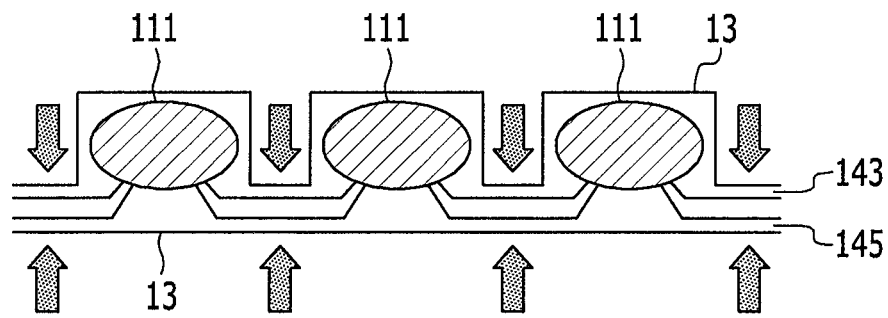
Figure 4C:
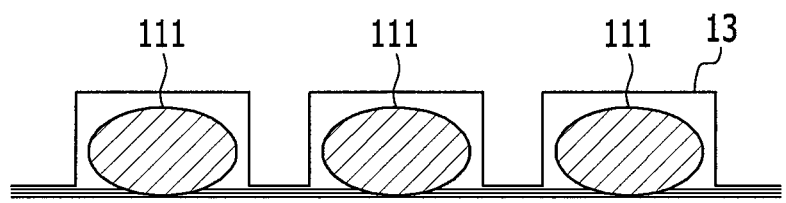

FIGS. 3A and 3B are schematic views showing that electrode assemblies of rechargeable batteries are joined together according to an exemplary embodiment of the present invention, and FIGS. 4A, 4B and 4C are schematic views showing that electrode assemblies are sealed with a sheathing portion (or a sheath) according to an exemplary embodiment of the present invention.

The rechargeable batteries 11 according to the present exemplary embodiment may be lithium ion rechargeable batteries which are each made of an electrode assembly and an electrolyte solution that are enclosed in a container of a given shape, or lithium ion rechargeable batteries which are produced by injecting an electrolyte solution just prior to (e.g., immediately before) sealing the electrode assemblies with the sheathing portion 13.

The following description will be given assuming that the rechargeable batteries 11 are lithium ion rechargeable batteries which are produced by injecting an electrolyte solution just prior to (e.g., immediately before) sealing the electrode assemblies with the sheathing portion 13.

Referring to FIG. 2A to FIG. 2C, the rechargeable batteries 11 embedded in the belt 1 are lithium ion rechargeable batteries, each including an electrode assembly including a positive plate, a negative plate, and a separator, which are produced by sealing the electrode assemblies with the sheathing portion 13 after injecting an electrolyte solution.

Any suitable electrolyte solution that is used in lithium ion rechargeable batteries by those skilled in the art can be used without limitation.

As will be described later, the electrolyte solution is injected and impregnated into the electrode assemblies just prior to when (e.g., immediately before) the electrode assemblies are sealed with the sheathing portion 13.

An electrode assembly may be formed by a positive electrode, a negative electrode, and a separator which are used in a lithium ion rechargeable battery by those skilled in the art.

The electrode assembly may have one or more of the structures shown in FIGS. 2A to 2C.

For example, as shown in FIGS. 2A and 2B, electrode assemblies 111A and 111B may be winding type of electrode assemblies, each of which is formed by winding a positive electrode and a negative electrode with a separator interposed between them.

As shown in FIG. 2A, the positive terminal 113A and the negative terminal 115A may protrude in the same direction as the winding axis of the electrode assembly 111A.

The positive terminal 113A is installed to protrude in two opposite directions of the electrode assembly 111A. The positive terminal 113A has a portion protruding in a first direction and a portion protruding in a second direction opposite to the first direction. The portion protruding in the first direction may protrude from the upper edge of the electrode assembly 111A, and the portion protruding in the second direction may protrude from the lower edge of the electrode assembly 111A.

The portion protruding in the first direction and the portion protruding in the second direction may be placed in a straight line or may be parallel to each other. The portion protruding in the first direction may be shorter or longer than the portion protruding in the second direction.

The negative terminal 115A is installed to protrude in two opposite directions of the electrode assembly 111A. The negative terminal 115A has a portion protruding in a first direction and a portion protruding in a second direction opposite to the first direction. The portion protruding in the first direction may protrude from the upper edge of the electrode assembly 111A, and the portion protruding in the second direction may protrude from the lower edge of the electrode assembly 111A.

The portion protruding in the first direction and the portion protruding in the second direction may be placed in a straight line or may be parallel to each other. The portion protruding in the first direction may be shorter or longer than the portion protruding in the second direction.

As shown in FIG. 2B, a positive terminal 113B and a negative terminal 115B may protrude from both side edges of the electrode assembly 111B in a direction orthogonal to the winding axis of the electrode assembly 111B. That is, the positive terminal 113B and the negative terminal 115B may be installed to protrude from one side edge of the electrode assembly 111B and protrude from the other side edge of the electrode assembly 111B.

As shown in FIG. 2C, an electrode assembly 111C may be a stacked electrode assembly which is formed by stacking a positive electrode and a negative electrode, with a separator interposed between them.

Also, a positive terminal 113C and a negative terminal 115C may protrude from opposite sides of the electrode assembly 111C.

In all of the electrode assemblies 115A, 115B, and 115C, the positive terminals 113A, 113B, and 113c are isolated from the negative terminals 115A, 115B, and 115C, respectively.

As shown in FIG. 3A and FIG. 3B, electrode assemblies 111 and 111' according to an exemplary embodiment of the present invention respectively include a positive terminal 113 and 113' and a negative terminal 115 and 115' which are isolated from each other and protrude from two opposite sides.

The electrode assemblies 111 and 111' are arranged in such a way that the positive terminal 113 and the positive terminal 113' face each other and the negative terminal 115 and the negative terminal 115' face each other, and are electrically connected to each other.

The positive terminals and the negative terminals may be resistance-welded or ultrasonic-bonded respectively to the positive terminals or the negative terminals.

A positive terminal and a negative terminal may be electrically connected, with different collector plates interposed between them.

The electrode assembly 111 according to the exemplary embodiment of the present invention is electrically connected to another electrode assembly 111' in sequence by the above-explained connecting method.

Accordingly, the positive and negative electrodes of each electrode assembly 111 are electrically connected to each other by joining portions 143 and 145 including a positive electrode joining portion 143 formed by connecting the positive terminal 113 to another positive terminal and a negative electrode joining portion 145 formed by connecting the negative terminal 115 to another negative terminal.

The electrode assemblies 111 are arranged in a line along one direction, with their positive and negative electrodes connected to each other.

The direction in which the electrode assemblies 111 are arranged in a line corresponds to the length of the belt 1 along which the electrode assemblies 111 are arranged after being sealed with the sheathing portion 13.

Accordingly, the shorter the length of the electrode assemblies 111, the more batteries arranged in a line may be provided for the same belt length.

Referring to FIGS. 4A, 4B and 4C, using the above-described method, an electrolyte solution is injected into the electrode assemblies 111 electrically connected to the positive electrode joining portion 143 and the negative electrode joining portion 145, and the electrode assemblies 111 and the electrolyte solution are sealed with the sheathing portion 13.

The sheathing portion 13 may be made of a water-resistant and insulative laminated film, or a metal sheath such as an aluminum laminated film or stainless laminated film, which is made insulative by covering the inside with a resin.

Accordingly, the sheathing portion 13 according to the present exemplary embodiment has relatively high (e.g., higher) water resistance and insulation properties.

As shown in the drawings, as the sheathing portion 13 is thermally fusion-bonded after the sealing of FIGS. 4A, 4B and 4C, the positive electrode joining portion 143 and the negative electrode joining portion 145 existing between the electrode assemblies 111 and the periphery of the sheathing portion 13 are compressed, creating a seal in the belt 1 according to the exemplary embodiment of the present invention.

The sheathing portion 13 may be of a size for integrally sealing the positive electrode joining portion 143, the negative electrode joining portion 145, and the electrode assemblies 111.

With this configuration, the electrode assemblies 111 according to the exemplary embodiment of the present invention can be sealed with the sheathing portion 13 having relatively high (e.g., high) water resistance and relatively high (e.g., high) insulation properties.

Using a metal jig conforming to the shape of the electrode assemblies 111, the electrode assemblies 111 can be sealed with the sheathing portion 13 made of a laminated film simply by thermal fusion bonding.

Although the sheathing portion 13 set forth above is a laminated film, the present invention is not limited to this example.

For instance, the sheathing portion 13 may be synthetic rubber or natural rubber.

With this configuration, the electrode assemblies 111 can be sealed with synthetic rubber or natural rubber which has relatively high (e.g., high) water resistance and relatively high (e.g., high) insulation properties.

By forming a seal of highly-flexible synthetic or natural rubber, the belt 1 becomes desirable as a belt.

According to the sealing method set forth above, the belt 1 according to the exemplary embodiment of the present invention allows the positive terminals 113 and negative terminals 115 of the electrode assemblies 111, the positive electrode joining portion 143, and the negative electrode joining portion 145 to be sealed and covered with the sheathing portion 13 without exposing them to the outside.

Since the belt 1 according to the exemplary embodiment of the present invention has a plurality of rechargeable batteries 11, it offers high capacity by electrically connecting the rechargeable batteries 11 in parallel.

As such, it may not be necessary for each rechargeable battery 11 to have high capacity, and therefore the safety of the rechargeable batteries 11 embedded in the belt 1 may be improved.

As the belt 1 according to the exemplary embodiment of the present invention is worn on the body, it will typically be used at ambient temperatures.

Accordingly, in some embodiments, the rechargeable batteries 11 embedded in the belt 1 may take into account only or primarily their ambient temperature characteristics, rather than their low-temperature or high-temperature characteristics, thereby further improving the battery characteristics.

Further, the belt 1 according to the exemplary embodiment of the present invention can prevent a short circuit at the electrode terminals of the rechargeable batteries 11 by using the sheathing portion 13 having water resistance and insulation properties.

Figure 5:
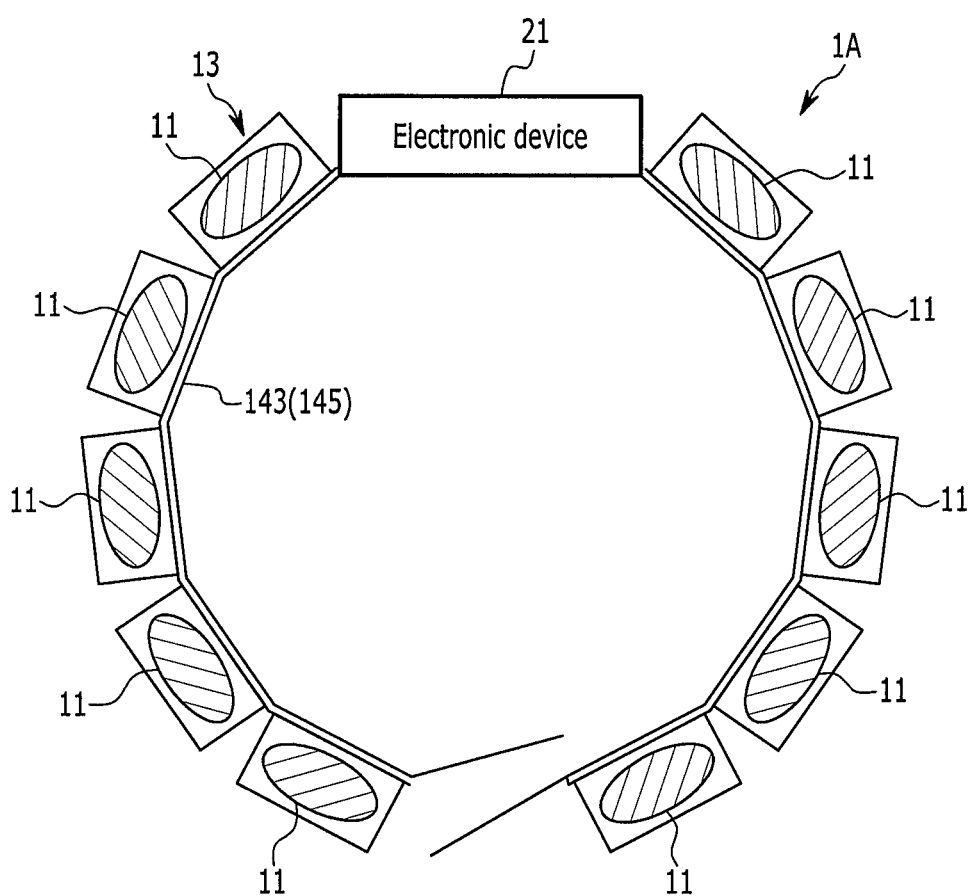
FIG. 5 is a schematic view showing a belt with built-in batteries according to a first modification of the present invention.
Figure 6:
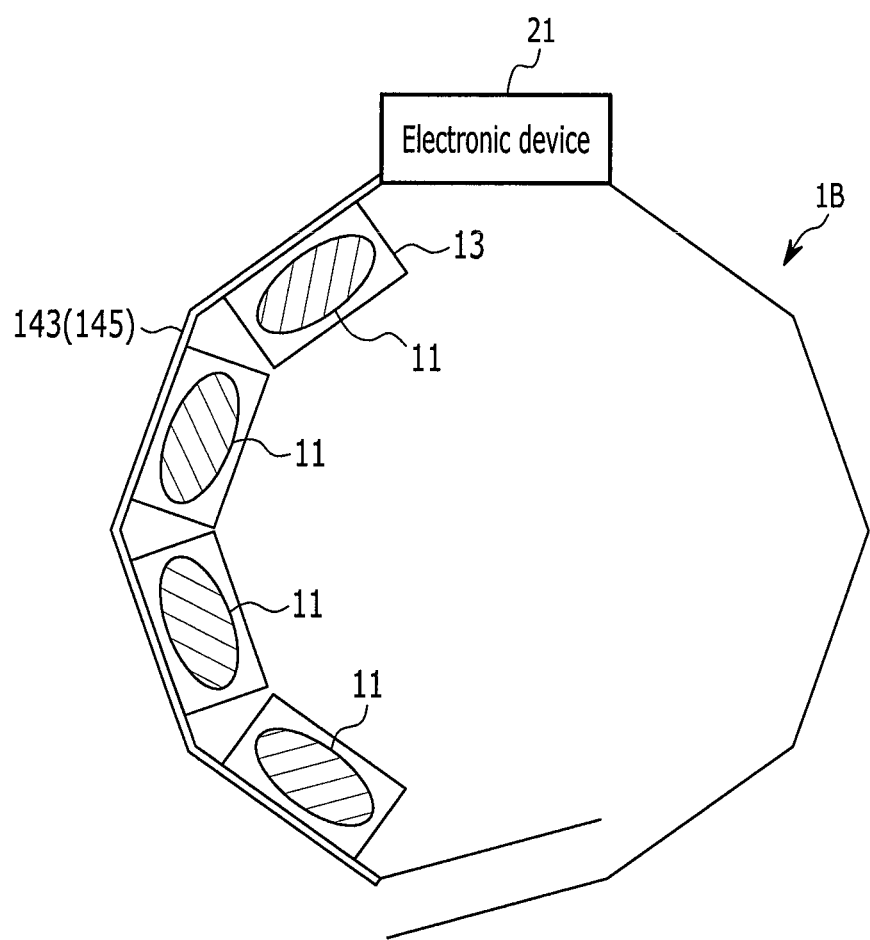
FIG. 6 is a schematic view showing a belt with built-in batteries according to a second modification of the present invention.
Figure 7:
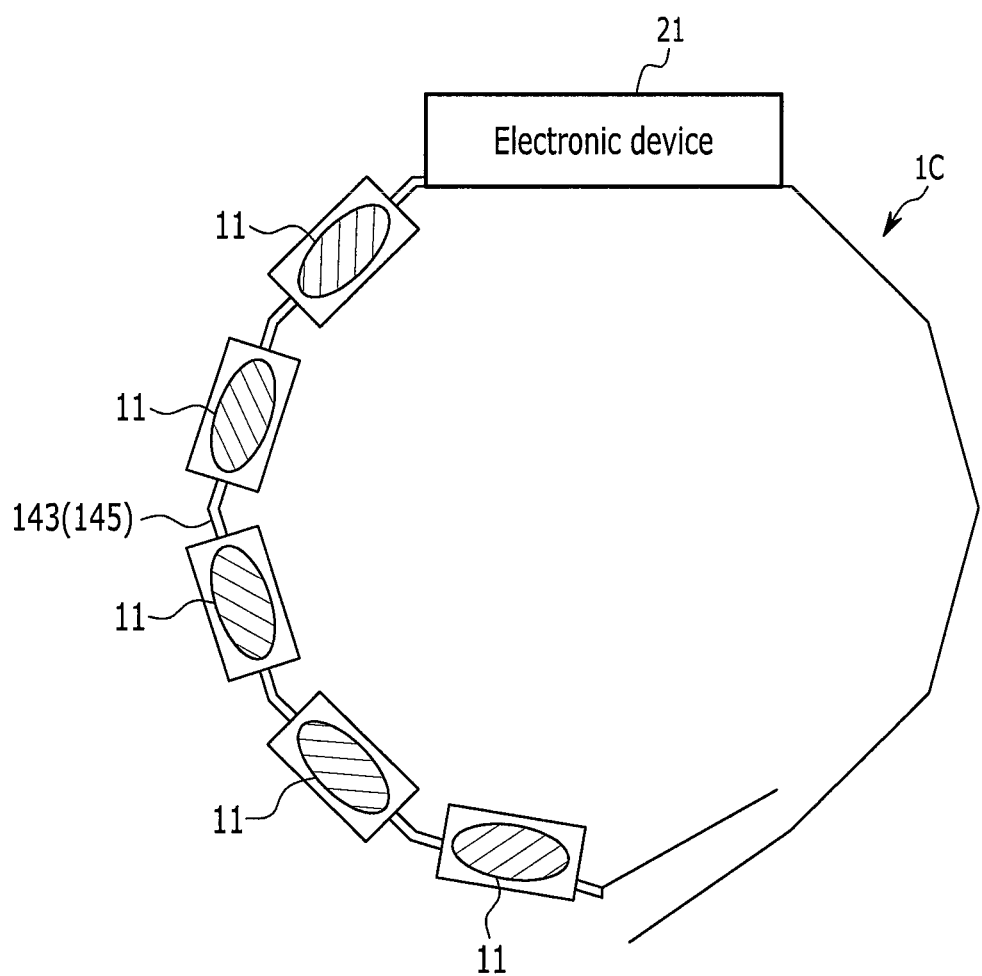
FIG. 7 is a schematic view showing a belt with built-in batteries according to a third modification of the present invention.

FIG. 5 is a schematic view showing a belt with built-in batteries according to a first modification of the present invention, FIG. 6 is a schematic view showing a belt with built-in batteries according to a second modification of the present invention, and FIG. 7 is a schematic view showing a belt with built-in batteries according to a third modification of the present invention.

Referring to FIG. 5, the positions where the rechargeable batteries 11 of a belt 1A according to the first modification of the present invention are embedded are different from the positions where the rechargeable batteries 11 of the belt 1 of FIG. 1 are embedded.

That is, while the rechargeable batteries 11 of the belt 1 described in reference to FIG. 1 are embedded at only one side of the belt 1 connected to both ends of the electronic device 21, the rechargeable batteries 11 of the belt 1A according to the first modification are embedded at both sides of the belt 1A connected to respective ends of the electronic device 21.

In the first modification of the present invention, it is possible to arbitrarily choose which side of the belt 1A is connected to both ends of the electronic device 21 and in what proportion of the belt 1A the rechargeable batteries 11 are embedded.

Referring to FIG. 6, the rechargeable batteries 11 of a belt 1B according to the second modification of the present invention are sealed with the sheathing portion 13 in such a way that the rechargeable batteries 11 protrude toward the body when mounted on the belt 1B.

In the belt 1B according to the second modification, the positive electrode joining portion 143 and the negative electrode joining portion 145 connecting the positive and negative terminals of the rechargeable batteries 11 are installed on one side of the sheathing portion 13 so that they are placed on the side opposite to the body when the belt 1B is worn.

With this configuration, the terminals and wires (i.e., the positive terminals, negative terminals, positive electrode joining portion 143, and negative electrode joining portion 145), which generate heat most easily in case of a malfunction of the rechargeable batteries 11, can be placed in such a way that they are kept from coming into direct contact with the body when the belt 1B is worn.

Accordingly, the belt 1B can improve user safety against a malfunction of the rechargeable batteries 11.

Referring to FIG. 7, in a belt 1C according to the third modification, the positive electrode joining portion 143 and negative electrode joining portion 145 electrically connecting the rechargeable batteries 11 are sealed with the sheathing portion 13 so that they are located in the middle of the thickness of the sheathing portion 13 of the belt 1C.

With this configuration, like the second modification, the terminals and wires (i.e., the positive terminals, negative terminals, positive electrode joining portion 143, and negative electrode joining portion 145), which generate heat most easily in case of a malfunction of the rechargeable batteries 11, can be located in such a way that they are kept from coming into direct contact with the body.

Figure 8:
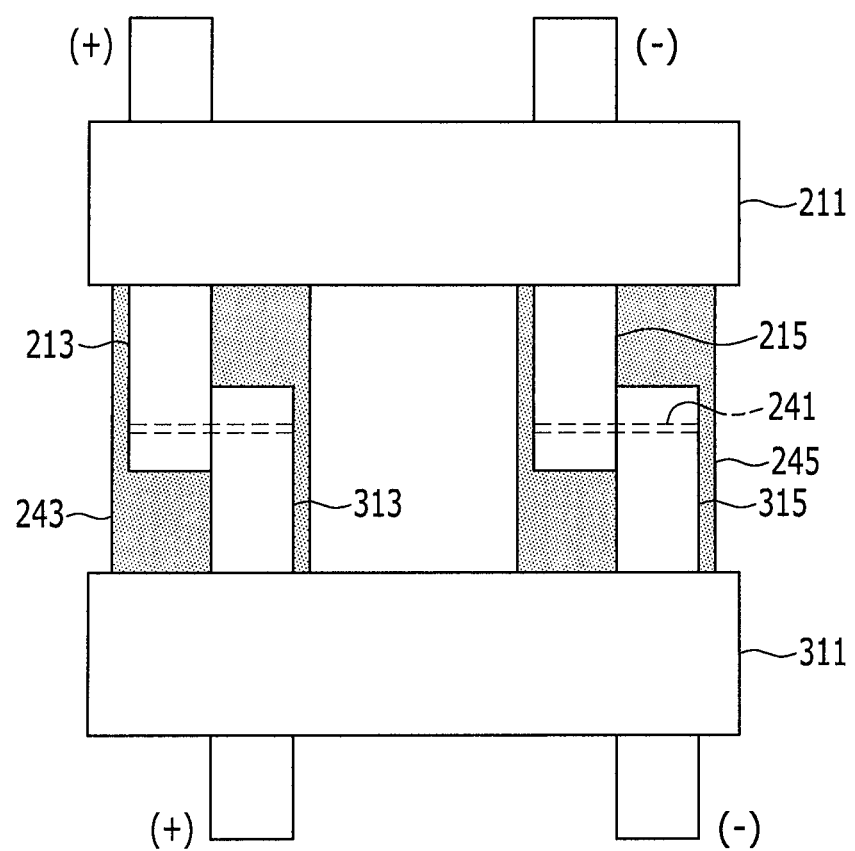
FIG. 8 is a schematic view showing the first modification in which electrode assemblies of rechargeable batteries embedded in a belt with built-in batteries according to another exemplary embodiment of the present invention are coupled together.

FIG. 8 is a schematic view showing the first modification in which electrode assemblies of rechargeable batteries embedded in a belt with built-in batteries according to another exemplary embodiment of the present invention are coupled together.

Referring to FIG. 8, a hinge structure can be used to connect electrode assemblies 211 and 311 according to the first modification.

For example, through-holes are formed in a negative terminal 215 of the electrode assembly 211 and a negative terminal 315 of the electrode assembly 311, respectively, and as pins 241 pass through the through-holes, the negative terminals 215 and 315 are held together in such a way that they are free to rotate with respect to each other.

Like the negative terminals, positive terminals 213 and 313 are joined by a hinge structure using pins so that they are free to rotate with respect to each other.

With this configuration, the electrode assembly 211 and the electrode assembly 311 joined by the hinge structures are free to rotate with respect to each other.

Accordingly, the belt using the electrode assemblies 211 and 311 connected in this manner provides better flexibility along the length.

When the positive and negative electrode joining portions 143 and 145 are formed by welding the electrode terminals together as shown in FIG. 3, there is the possibility that, when the belt is repeatedly bent, the positive and negative electrode joining portions 143 and 145 might have a repetition of bends and suffer from a short-circuit due to fatigue damage.

On the other hand, according to the first modification regarding the connection of the electrode assemblies, there is less possibility (e.g., little or no possibility) of a short circuit because the positive electrode joining portion 143 and the negative electrode joining portion 145 are freely rotatable by a hinge structure.

A negative reinforcing tab 245 is connected to the negative terminals 215 and 315 by welding, and a positive reinforcing tab 243 is connected to the positive terminals 213 and 313 by welding. The negative reinforcing tab 245 is installed in such a way as to cover the hinge structure that connects the negative terminals 215 and 315, and the positive reinforcing tab 243 is installed in such a way as to cover the hinge structure that connects the positive terminals 213 and 313.

The positive reinforcing tab 243 may be installed in a way that covers one side or both sides of each of the positive terminals 213 and 313, and the negative reinforcing tab 245 may be installed in a way that covers one side or both sides of each of the negative terminals 215 and 315.

Figure 9:
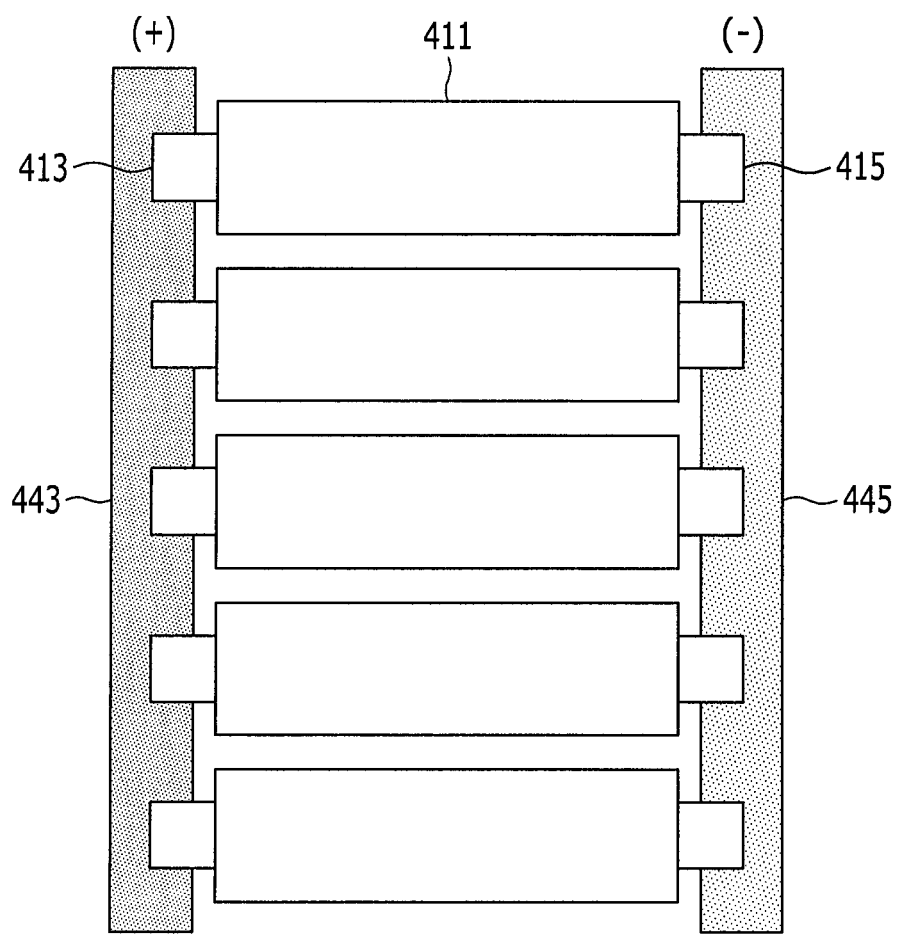
FIG. 9 is a schematic view showing the second modification in which electrode assemblies of rechargeable batteries embedded in a belt with built-in batteries according to another exemplary embodiment of the present invention are coupled together.

FIG. 9 is a schematic view showing the second modification in which electrode assemblies of rechargeable batteries embedded in a belt with built-in batteries according to another exemplary embodiment of the present invention are coupled together.

Referring to FIG. 9, in electrode assemblies 411 according to the second modification, positive terminals 413 and negative terminals 415 protrude in a direction orthogonal to the direction along which the electrode assemblies 411 are arranged.

The positive terminals 413 are connected to a positive electrode joining portion 443 which serves as a collector connecting the positive terminals of the electrode assemblies to each other, and the negative terminals 415 are connected to a negative electrode joining portion 445 which serves as a collector connecting the negative terminals of the electrode assemblies to each other.

With this configuration, as the positive electrode joining portion 143 and the negative electrode joining portion 145 do not exist between the electrode assemblies, the space between the electrode assemblies can be narrowed.

Accordingly, the belt using the electrode assemblies connected in this manner can accommodate more batteries for the same belt length, which makes it possible to improve the battery capacity of the belt with built-in batteries.

Figure 10A:
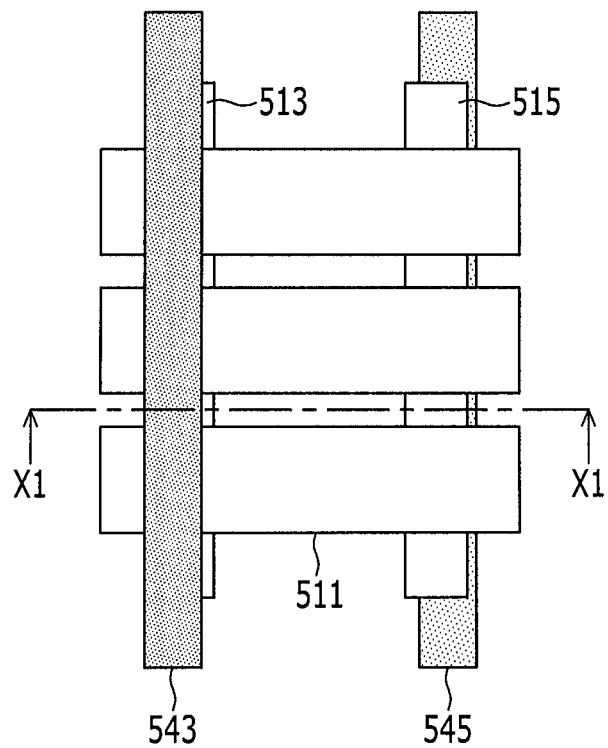
FIG. 10A is a schematic view showing the third modification in which electrode assemblies of rechargeable batteries embedded in a belt with built-in batteries according to another exemplary embodiment of the present invention are coupled together.
Figure 10B:
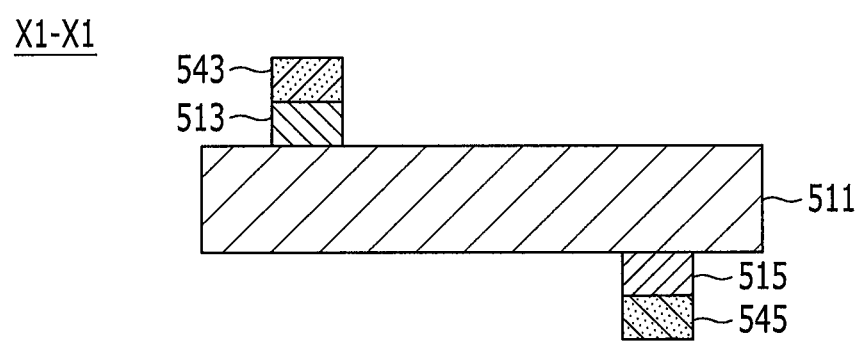
FIG. 10B is a cross-sectional view taken along the line X1-X1 of FIG. 10A.

FIG. 10A is a schematic view showing the third modification in which electrode assemblies of rechargeable batteries embedded in a belt with built-in batteries according to another exemplary embodiment of the present invention are coupled together, and FIG. 10B is a cross-sectional view taken along the line X1-X1 of FIG. 10A.

Referring to FIG. 10A and FIG. 10B, in electrode assemblies 511 according to the third modification, positive terminals 513 and negative terminals 515 protrude in the direction along which the electrode assemblies 511 are arranged. That is, two positive terminals 513 protrude from each electrode assembly 511 in opposite directions to each other, and two negative terminals 515 protrude from each electrode assembly 511 in opposite directions to each other.

As shown in FIG. 10B, the positive terminals 513 and the negative terminals 515 are formed on opposite sides in the thickness direction of the electrode assemblies 511.

The positive terminals 513 are connected to a positive reinforcing tab 543 that connects the positive terminals 513 of the electrode assemblies 511 to each other, and the negative terminals 515 are connected to a negative reinforcing tab 545 that connects the negative terminals 515 of the electrode assemblies 511 to each other. The positive reinforcing tab 543 and the negative reinforcing tab 545 may be made of a copper-containing metal such as copper or a copper alloy.

The positive reinforcing tab 543 is connected to the positive terminals 513 by welding, and the negative reinforcing tab 545 is connected to the negative terminals 515 by welding, and the positive reinforcing tab 543 and the negative reinforcing tab 545 extend along the length of the sheathing portion. The positive reinforcing tab 543 is welded to a plurality of positive terminals 513 thereby to electrically connect at least three rechargeable batteries. Likewise, the negative reinforcing tab 545 is welded to a plurality of negative terminals 515 thereby to electrically connect at least three rechargeable batteries.

The positive reinforcing tab 543 may be connected to the positive terminals 513 by ultrasonic welding, resistance welding, etc., and the negative reinforcing tab 545 may be connected to the negative terminals 515 by ultrasonic welding, resistance welding, etc. The positive reinforcing tab 543 and the negative reinforcing tab 545 are bent in an arc shape in some example embodiments.

The positive reinforcing tab 543 and the negative reinforcing tab 545 may be formed on opposite sides in the thickness direction of the electrode assemblies 511. The positive reinforcing tab 543 is located on a first side of each rechargeable battery, and the negative reinforcing tab 545 is located on a second side of each rechargeable battery opposite to the first side.

In other words, the positive terminals 513 and the positive reinforcing tab 543 and the negative terminal 515 and the negative reinforcing tab 545 may be formed on a diagonal line, with the electrode assemblies 511 interposed between them.

Since rigidity can be improved by providing the reinforcing tabs welded to the terminals, the terminals are kept or substantially prevented from breakage even if they are repeatedly bent. Moreover, the terminals can be held in two opposite directions as the reinforcing tabs are welded to different sides. In addition, as the reinforcing tabs extend longitudinally, the terminals can be made larger in length and bend with more flexibility as compared to when they are simply connected.

Figure 11A:
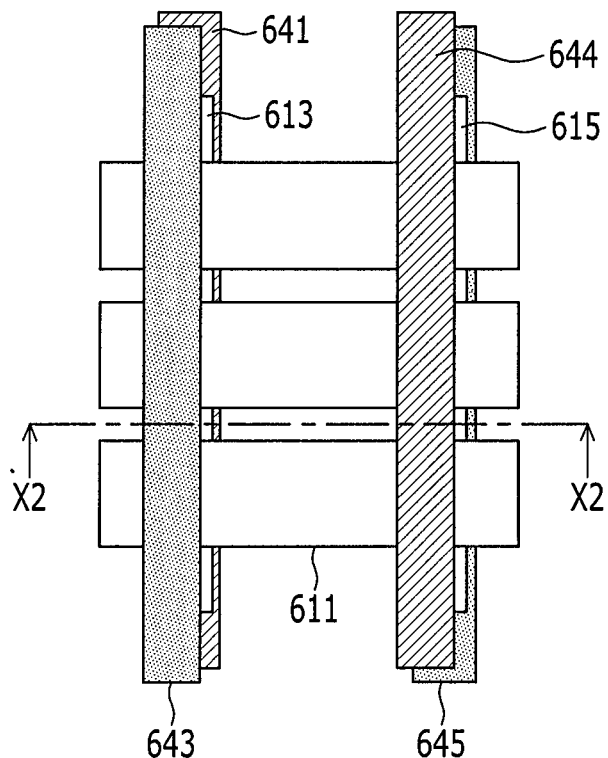
FIG. 11A is a schematic view showing a fourth modification in which electrode assemblies of rechargeable batteries embedded in a belt with built-in batteries according to another exemplary embodiment of the present invention are coupled together.
Figure 11B:
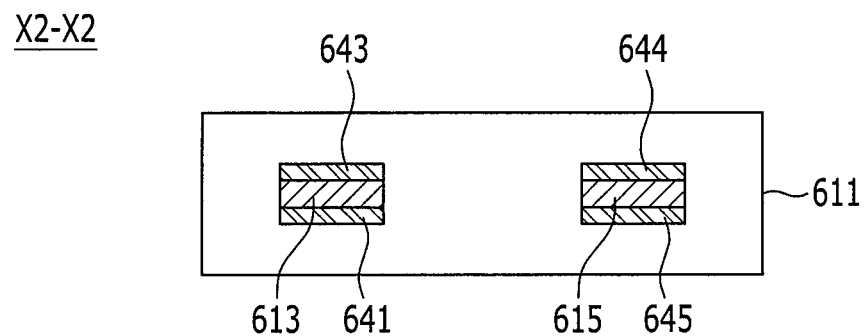
FIG. 11B is a cross-sectional view taken along the line X2-X2 of FIG. 11A.

FIG. 11A is a schematic view showing a fourth modification in which electrode assemblies of rechargeable batteries embedded in a belt with built-in batteries according to another exemplary embodiment of the present invention are coupled together, and FIG. 11B is a cross-sectional view taken along the line X2-X2 of FIG. 11A.

Referring to FIG. 11A and FIG. 11B, in electrode assemblies 611 according to the fourth modification, positive terminals 613 and negative terminals 615 protrude in the direction along which the electrode assemblies 611 are arranged. That is, two positive terminals 613 protrude from each electrode assembly 611 in opposite directions to each other, and two negative terminals 615 protrude from each electrode assembly 611 in opposite directions to each other.

As shown in FIG. 11B, the positive terminals 613 are connected to positive reinforcing tabs 641 and 643 that connect the positive terminals 613 of the electrode assemblies 611 and the negative terminals 615 are connected to negative reinforcing tabs 644 and 645 that connect the negative terminals 615 of the electrode assemblies 611. The positive reinforcing tabs 641 and 643 and the negative reinforcing tabs 644 and 645 may be made of a copper-containing metal such as copper or a copper alloy.

Two positive reinforcing tabs 641 and 643 are welded to either side of each positive terminal 613. Two reinforcing tabs 644 and 645 are welded to either side of each negative terminal 615. The positive reinforcing tabs 641 and 643 and the negative reinforcing tabs 644 and 645 extend along the length of the sheathing portion.

The positive reinforcing tabs 641 and 643 are welded to a plurality of positive terminals 613 and electrically connect at least three rechargeable batteries. Likewise, the negative reinforcing tabs 644 and 645 are welded to a plurality of negative terminals 615 and electrically connect at least three rechargeable batteries.

The positive reinforcing tabs 641 and 643 may be connected to the positive terminals 613 by ultrasonic welding, resistance welding, etc., and the negative reinforcing tabs 644 and 645 may be connected to the negative terminals 615 by ultrasonic welding, resistance welding, etc.

Since rigidity can be further improved by welding the reinforcing tabs to either side of each terminal, the terminals are kept or substantially prevented from breakage even if they are repeatedly bent.

Figure 12A:
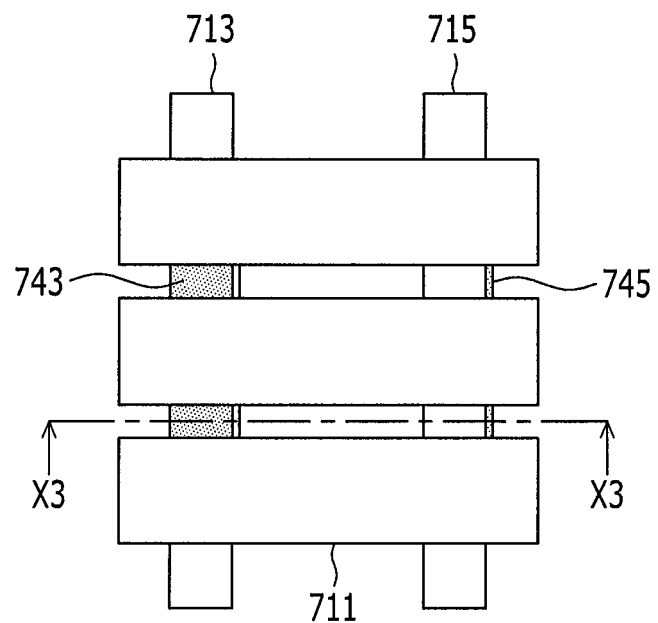
FIG. 12A is a schematic view showing a fifth modification in which electrode assemblies of rechargeable batteries embedded in a belt with built-in batteries according to another exemplary embodiment of the present invention are coupled together.
Figure 12B:
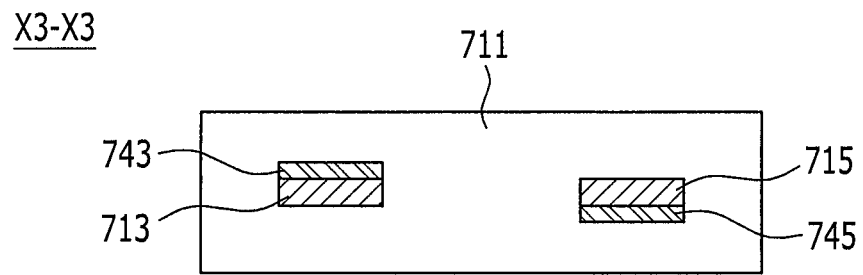
FIG. 12B is a cross-sectional view taken along the line X3-X3 of FIG. 12A.

FIG. 12A is a schematic view showing a fifth modification in which electrode assemblies of rechargeable batteries embedded in a belt with built-in batteries according to another exemplary embodiment of the present invention are coupled together, and FIG. 12B is a cross-sectional view taken along the line X3-X3 of FIG. 12A.

Referring to FIG. 12A and FIG. 12B, in electrode assemblies 711 according to the fifth modification, positive terminals 713 and negative terminals 715 protrude in the direction along which the electrode assemblies 711 are arranged. That is, two positive terminals 713 protrude from each electrode assembly 711 in opposite directions to each other, and two negative terminals 715 protrude from each electrode assembly 711 in opposite directions to each other.

As shown in FIG. 12B, the positive terminals 713 are connected to a positive reinforcing tab 743 that connects the positive terminals 713 of the electrode assemblies 711 to each other, and the negative terminals 715 are connected to a negative reinforcing tab 745 that connects the negative terminals 715 of the electrode assemblies 711 to each other. The positive reinforcing tab 743 and the negative reinforcing tab 745 may be made of a copper-containing metal such as copper or a copper alloy.

The positive reinforcing tab 743 is welded to a side of each positive terminal 714 facing a first direction, and the negative reinforcing tab 745 is welded to a side of each negative terminal 715 facing a second direction opposite to the first direction. For example, in the embodiment of FIGS. 12A and 12B, the positive reinforcing tab 743 and the negative reinforcing tab 745 are installed only where the terminals are located, and do not extend to the electrode assemblies 711. However, the present invention is not limited thereto.

Figure 13A:
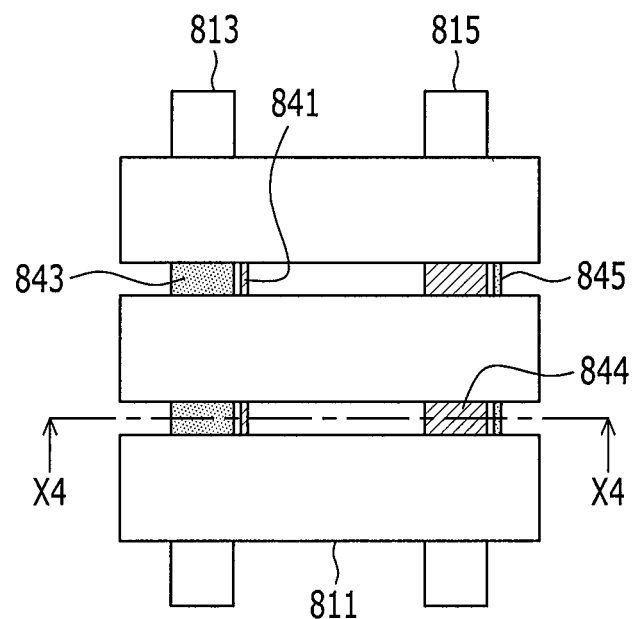
FIG. 13A is a schematic view showing a sixth modification in which electrode assemblies of rechargeable batteries embedded in a belt with built-in batteries according to another exemplary embodiment of the present invention are coupled together.
Figure 13B:
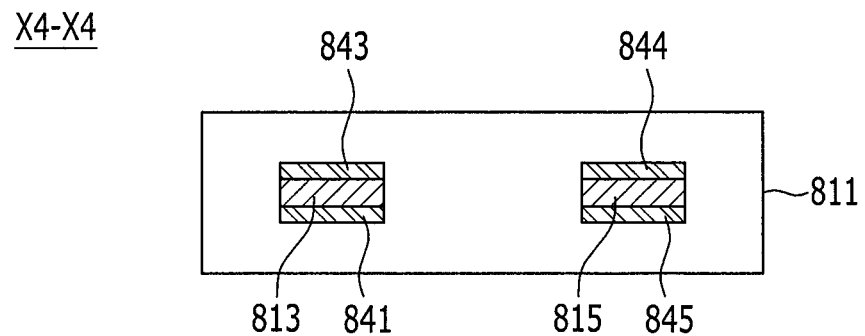
FIG. 13B is a cross-sectional view taken along the line X4-X4 of FIG. 13A.

FIG. 13A is a schematic view showing a sixth modification in which electrode assemblies of rechargeable batteries embedded in a belt with built-in batteries according to another exemplary embodiment of the present invention are coupled together, and FIG. 13B is a cross-sectional view taken along the line X4-X4 of FIG. 13A.

Referring to FIG. 13A and FIG. 13B, in electrode assemblies 811 according to the sixth modification, positive terminals 813 and negative terminals 815 protrude in the direction along which the electrode assemblies 811 are arranged. That is, two positive terminals 813 protrude from each electrode assembly 811 in opposite directions to each other, and two negative terminals 815 protrude from each electrode assembly 811 in opposite directions to each other.

As shown in FIG. 13B, the positive terminals 813 are connected to positive reinforcing tabs 841 and 843 that connect the positive terminals 813 of the electrode assemblies 811 to each other, and the negative terminals 815 are connected to negative reinforcing tabs 841 and 845 that connect the negative terminals 815 of the electrode assemblies 811 to each other. The positive reinforcing tabs 841 and 843 and the negative reinforcing tabs 844 and 845 may be made of a copper-containing metal such as copper or a copper alloy.

Two positive reinforcing tabs 841 and 843 are welded to either side of each positive terminal 813. Two reinforcing tabs 844 and 845 are welded to either side of each negative terminal 815. In the embodiment shown in FIGS. 13A and 13B, the positive reinforcing tabs 841 and 843 and the negative reinforcing tabs 844 and 845 are installed only where the terminals are located, and do not extend to the electrode assemblies 811. However, the present invention is not limited thereto.

As described above, a belt with built-in batteries according to an exemplary embodiment of the present invention can prevent or substantially prevent a short circuit at electrode terminals by covering and sealing positive terminals, negative terminals, and wiring parts with a sheathing portion (or a sheath) having water resistance and insulation properties.

The belt with built-in batteries according to the exemplary embodiment of the present invention can improve battery capacity by accommodating more rechargeable batteries.

Accordingly, the belt with built-in batteries according to the exemplary embodiment of the present invention can enhance the available use time of an electronic device connected to the belt.

According to the belt with built-in batteries according to the exemplary embodiment of the present invention, the terminals are kept or substantially prevented from breakage as they are held by the tabs added to them. Moreover, as the reinforcing tabs extend longitudinally, the terminals can bend with more flexibility.

Although the exemplary embodiments set forth above focus on the rechargeable batteries 11 arranged in a line and embedded in the belt 1, the present invention is not limited to this example.

For instance, the rechargeable batteries 11 may be arranged in two or more multiple rows and embedded in the belt 1.

Alternatively, the rechargeable batteries 11 may be arranged in a matrix form and embedded in the belt 1.

While the present invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims, and their equivalents.

| Description of some of the symbols | |
| --- | --- |
| rechargeable battery: 11 | sheathing portion (or sheath): 13 |
| buckle portion: 15A, 15B | electronic device: 21 |
| electrode assembly: 111 | positive terminal: 113 |
| negative terminal: 115 | |
| positive electrode joining portion: 143 | |
| negative electrode joining portion: 145 | positive reinforcing tab: 243 |
| negative reinforcing tab: 245 | |

What is claimed is:

1. A belt with built-in batteries comprising:
   a plurality of rechargeable batteries, each having a positive terminal and a negative terminal that protrude in two opposite directions;
   a positive reinforcing tab that electrically connects the positive terminals of the rechargeable batteries to each other;
   a negative reinforcing tab that electrically connects the negative terminals of the rechargeable batteries to each other; and a sheath that seals the positive and negative terminals of the rechargeable batteries and the positive and negative reinforcing tabs.

2. The belt of claim 1, wherein the positive reinforcing tab is welded to a side of each of the positive terminals facing a first direction, and the negative reinforcing tab is welded to a side of each of the negative terminals facing a second direction opposite to the first direction.

3. The belt of claim 1, wherein the positive reinforcing tab and the negative reinforcing tab extend along a length of the sheath, and the positive reinforcing tab is welded to a plurality of positive terminals and located on a first side of each of the rechargeable batteries, and the negative reinforcing tab is welded to a plurality of negative terminals and located on a second side of each of the rechargeable batteries opposite to the first side.

4. The belt of claim 1, wherein the positive reinforcing tab comprises a plurality of positive reinforcing tabs and is welded to either side of each positive terminal.

5. The belt of claim 1, wherein the negative reinforcing tab comprises a plurality of negative reinforcing tabs and is welded to either side of each negative terminal.

6. The belt of claim 1, wherein the positive reinforcing tab and the negative reinforcing tab extend along a length of the sheath, and the positive reinforcing tab is welded to either side of each positive terminal, and the negative reinforcing tab is welded to either side of each negative terminal.

7. The belt of claim 1, wherein the rechargeable batteries each comprise an electrode assembly formed by winding positive electrode, a negative electrode, and a separator.

8. The belt of claim 7, wherein the positive terminal and the negative terminal protrude in the same direction as a winding axis of the electrode assembly.

9. The belt of claim 7, wherein the positive terminal and the negative terminal protrude in a direction orthogonal to a winding axis of the electrode assembly.

10. The belt of claim 7, wherein the rechargeable batteries comprise polymer batteries with a gel electrolyte.

11. The belt of claim 1, wherein the rechargeable batteries are electrically connected in parallel by the positive reinforcing tab and the negative reinforcing tab.

12. The belt of claim 11, wherein the rechargeable batteries are arranged in at least one line along a length of the sheath.

13. The belt of claim 12, wherein the positive and negative terminals of one of the rechargeable batteries are placed to face the positive and negative terminals of another rechargeable battery adjacent in a length direction of the sheath.

14. The belt of claim 1, wherein the positive terminals and the negative terminals are joined by a hinge structure, and the positive reinforcing tab and the negative reinforcing tab are installed in such a way as to cover the hinge structure.

15. The belt of claim 1, the sheath integrally seals the positive terminals, the negative terminals, the positive reinforcing tab, and the negative reinforcing tab.

16. The belt of claim 15, wherein the sheath comprises a laminate film.

17. The belt of claim 1, wherein the positive reinforcing tab and the negative reinforcing tab are bent.

18. The belt of claim 1, wherein the sheath further comprises a connecting portion that is configured to be connected to an electronic device located on one end of a length of the sheath and allows conduction between the rechargeable batteries and the electronic device.

19. The belt of claim 18, further comprising buckle portions that are located at one end of the length of the sheath and the other end, respectively, to adjust the length of the sheath.

20. The belt of claim 1, wherein the positive reinforcing tab and the negative reinforcing tab comprises a copper-containing metal.

* * * * *